(12) United States Patent
Lehmann Madsen

(10) Patent No.: US 10,913,214 B2
(45) Date of Patent: Feb. 9, 2021

(54) WIND TURBINE BLADE WITH IMPROVED GLUE JOINT AND RELATED METHOD

(71) Applicant: LM WIND POWER US TECHNOLOGY APS, Kolding (DK)

(72) Inventor: Kristian Lehmann Madsen, Fredericia (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 78 days.

(21) Appl. No.: 16/312,350

(22) PCT Filed: Jun. 21, 2017

(86) PCT No.: PCT/EP2017/065263
§ 371 (c)(1),
(2) Date: Dec. 21, 2018

(87) PCT Pub. No.: WO2017/220665
PCT Pub. Date: Dec. 28, 2017

(65) Prior Publication Data
US 2019/0210296 A1    Jul. 11, 2019

(30) Foreign Application Priority Data

Jun. 22, 2016    (EP) .................................... 16175791

(51) Int. Cl.
*B29C 65/54*    (2006.01)
*B29C 65/78*    (2006.01)
(Continued)

(52) U.S. Cl.
CPC ............ *B29C 65/542* (2013.01); *B29C 65/54* (2013.01); *B29C 65/7829* (2013.01);
(Continued)

(58) Field of Classification Search
None
See application file for complete search history.

(56) References Cited

U.S. PATENT DOCUMENTS

2011/0142674 A1    6/2011   Dixon
2015/0224759 A1*   8/2015   Boon .................. B32B 38/1808
                                                           156/324

(Continued)

FOREIGN PATENT DOCUMENTS

| EP | 1695813 | A1 | 8/2006 | |
| GB | 2529186 | A * | 2/2016 | ......... B29C 65/7841 |
| GB | 2529439 | A * | 2/2016 | ......... B29C 65/7808 |

*Primary Examiner* — Michael Lebentritt
(74) *Attorney, Agent, or Firm* — Nath, Goldberg & Meyer; Jerald L. Meyer; Tanya E. Harkins

(57) ABSTRACT

A blade shell part for a wind turbine blade and a wind turbine blade are disclosed. The blade shell part is made of a composite structure comprising a reinforcement material embedded in a polymer matrix, the blade shell part extending from a tip end to a root end, wherein the blade shell part comprises: a blade shell body with a leading edge and a trailing edge, and a first glue flange extending from the leading edge and having a first glue flange edge and a first glue surface with a first width, wherein the first glue flange is provided with one or more spacer elements. Further, a method of manufacturing a wind turbine blade is described.

16 Claims, 7 Drawing Sheets

Figure 1:
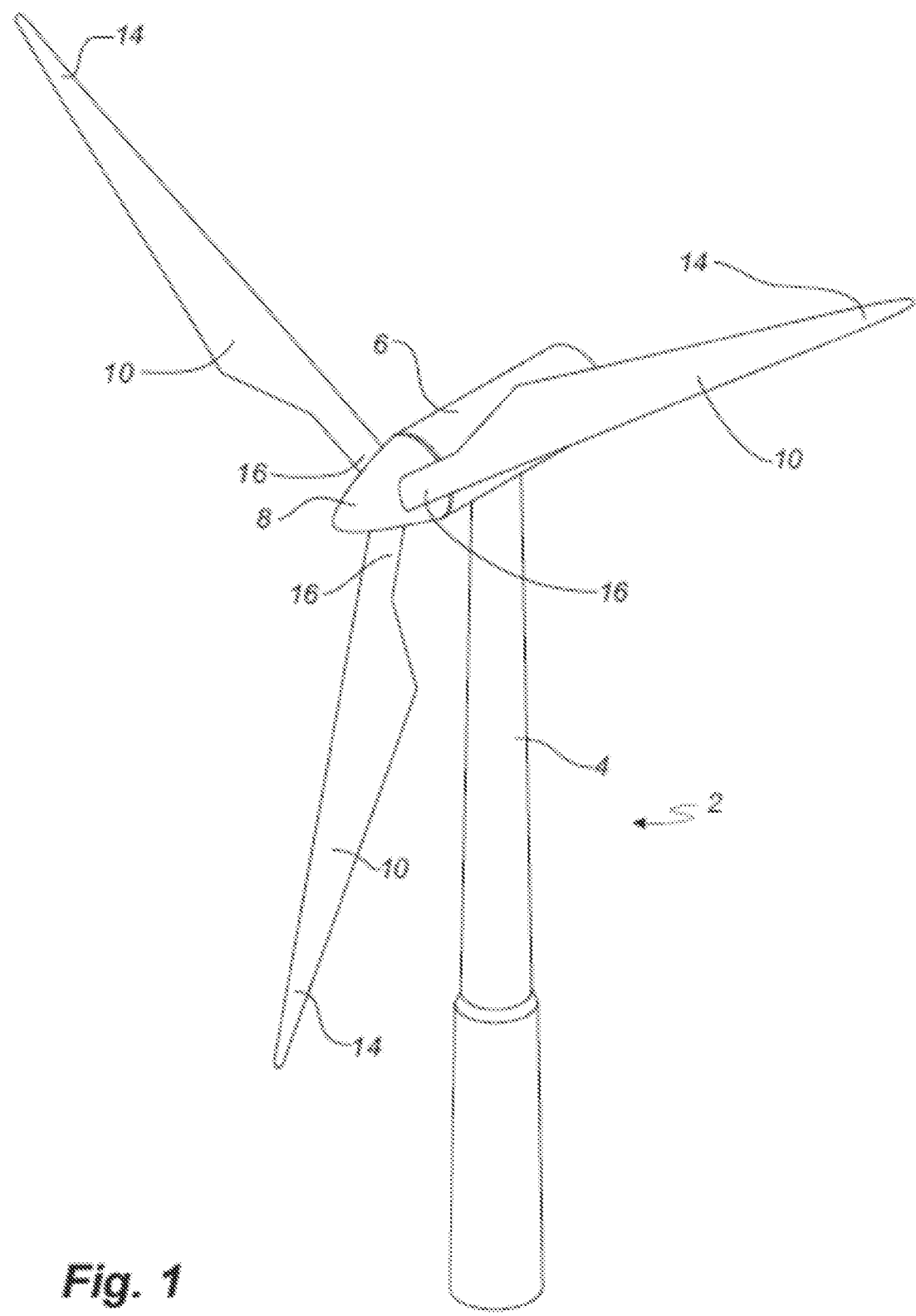

(51) Int. Cl.
*B29C 65/00* (2006.01)
*F03D 1/06* (2006.01)
*B29L 31/08* (2006.01)

(52) U.S. Cl.
CPC ...... *B29C 66/1222* (2013.01); *B29C 66/1228* (2013.01); *B29C 66/1312* (2013.01); *B29C 66/3242* (2013.01); *B29C 66/54* (2013.01); *B29C 66/721* (2013.01); *F03D 1/0675* (2013.01); *B29C 66/7212* (2013.01); *B29L 2031/085* (2013.01); *F05B 2230/23* (2013.01); *Y02E 10/72* (2013.01); *Y02P 70/50* (2015.11)

(56) References Cited

U.S. PATENT DOCUMENTS

| | | | |
|---|---|---|---|
| 2015/0316023 A1* | 11/2015 | Sandercock | B29D 99/0028 416/229 A |
| 2017/0001387 A1* | 1/2017 | Ostergaard | B29C 70/342 |
| 2017/0022968 A1* | 1/2017 | Caruso | F03D 1/0675 |
| 2017/0050372 A1* | 2/2017 | Nielsen | B29C 65/48 |
| 2019/0232571 A1* | 8/2019 | Schibsbye | B29C 65/483 |
| 2019/0293048 A1* | 9/2019 | Roberts | B29C 65/1425 |
| 2020/0056582 A1* | 2/2020 | Schuring Roelof | F03D 1/0675 |

* cited by examiner

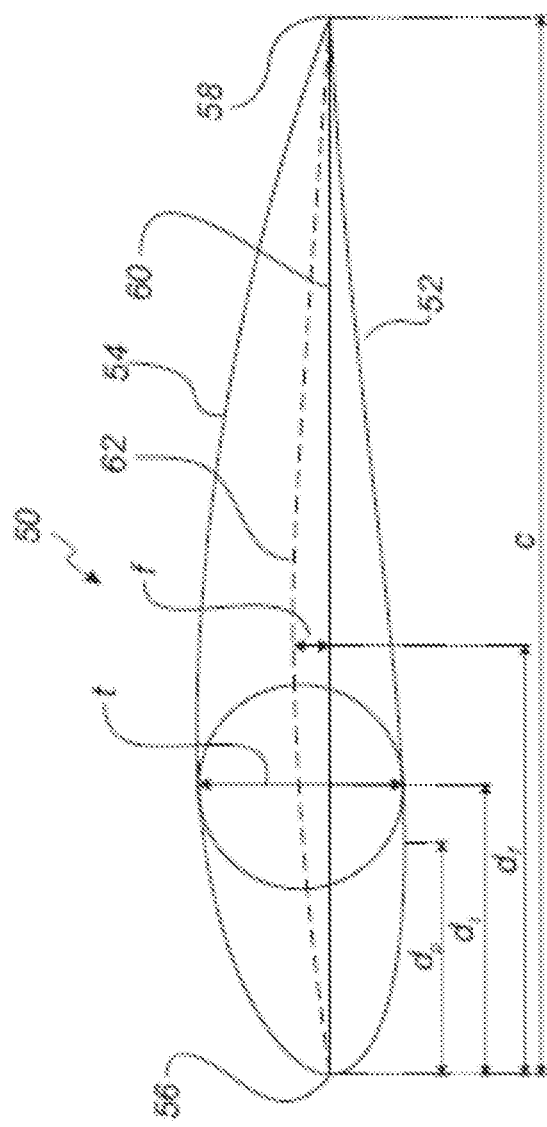
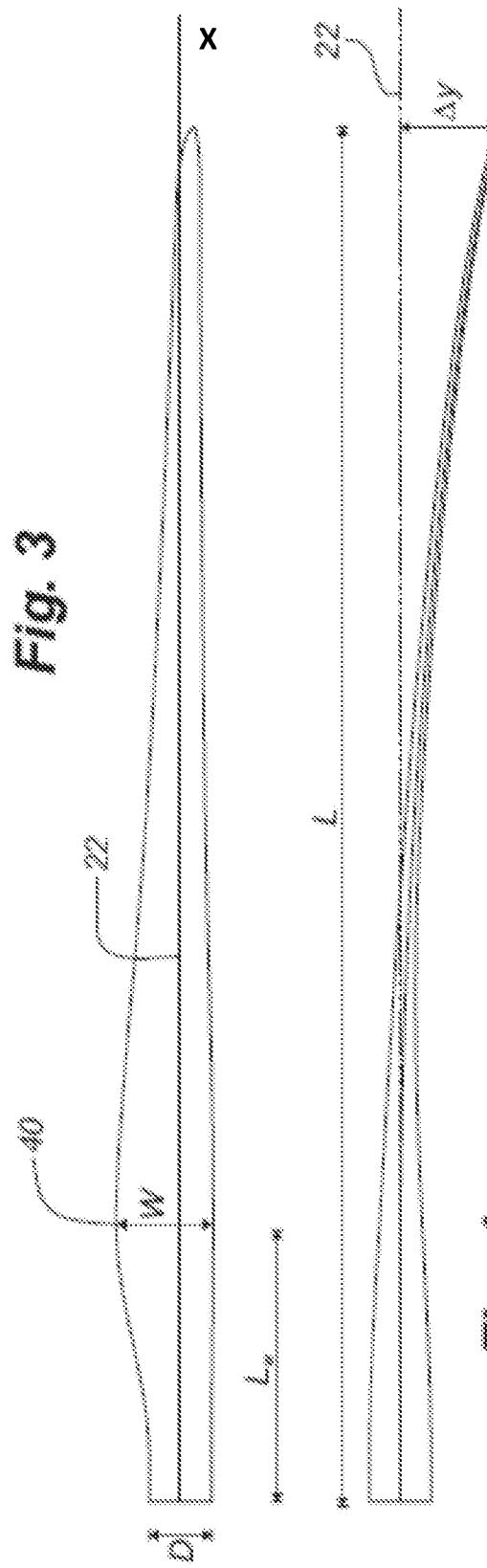

WIND TURBINE BLADE WITH IMPROVED GLUE JOINT AND RELATED METHOD

This is a National Phase Application filed under 35 U.S.C. 371 as a national stage of PCT/EP2017/065263, filed Jun. 21, 2017, an application claiming the benefit of European Application No. 16175791.9, filed Jun. 22, 2016, the content of each of which is hereby incorporated by reference in its entirety.

TECHNICAL FIELD

The present disclosure pertains to the field of manufacturing wind turbine blades and parts thereof. In particular, the present disclosure relates to a blade shell part and a wind turbine blade. Further, the present disclosure relates to a method of manufacturing a wind turbine blade.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other reinforcement material, such as carbon fibre, in each of the two mould parts. Then, the two halves are glued together, often by means of internal flange parts. Glue is applied to the inner face of the lower or first blade shell half before the upper or second blade shell half is lowered thereon. Additionally, one or two reinforcing profiles (shear webs) are often glued to the inside of the lower blade half prior to gluing to the upper blade half. The glue joints, also denoted adhesive joints, are known to represent a weak link in the structural integrity of wind turbine blades.

US 2015/0137419 relates to a bonding method and apparatus for bonding assembly parts together, the parts having adhesive surfaces on end surfaces thereof to be joined together, e.g., for bonding together rotor blade half shells to form a rotor blade for a wind turbine. The assembly parts can be bonded together by injection-bonding, an adhesive being injected into an adhesive joint between the adhesive surfaces of the assembly parts.

SUMMARY OF THE INVENTION

Accordingly, there is a need for systems and methods that will improve glue joint strength of a wind turbine blade. Further, it is an object of the invention to provide a system and method for the joining of blade shell parts which addresses the above problems, in particular providing reduced weight and adhesive use for a wind turbine blade, while improving the performance of bonding areas/glue joints in wind turbine blades.

Accordingly, there is provided a blade shell part, such as a first blade shell part, for a wind turbine blade, wherein the blade shell part is made of a composite structure comprising a reinforcement material embedded in a polymer matrix, the blade shell part extending from a tip end to a root end, wherein the blade shell part comprises a blade shell body with a leading edge and a trailing edge, and a first glue flange extending from the leading edge and having a first glue flange edge and a first glue surface with a first width. The first glue flange, e.g. the first glue surface of the first glue flange, may be provided with one or more spacer elements, such as a plurality of spacer elements.

Also provided is a wind turbine blade comprising a first blade shell part and a second blade shell part, wherein the first blade shell part is a blade shell part as described herein, the second blade shell part comprising a blade shell body with a leading edge and a trailing edge and having a second glue surface on an inner surface thereof. At least one of the spacer elements may contact the second glue surface and glue is arranged between the first glue surface and the second glue surface.

Further, a method of manufacturing a wind turbine blade, wherein the wind turbine blade is manufactured as a composite structure comprising a reinforcement material embedded in a polymer matrix is disclosed, the method comprising: providing a first blade shell part comprising a blade shell body with a leading edge and a trailing edge, and a first glue flange, e.g. at the leading edge and/or at the trailing edge of the wind turbine blade, the first glue flange having a first glue flange edge and a first glue surface with a first width; optionally providing one or more spacer elements, e.g. on the first glue flange/first glue surface; providing a second blade shell part comprising a blade shell body with a leading edge and a trailing edge, and a second glue surface; arranging the second blade shell part on the first blade shell part, optionally such that at least one of the spacer elements contact the second glue surface of the second blade shell part; and injecting glue between the first glue surface and the second glue surface. The method may be a method for manufacturing a wind turbine blade as disclosed herein.

Even further, a method of manufacturing a wind turbine blade, wherein the wind turbine blade is manufactured as a composite structure comprising a reinforcement material embedded in a polymer matrix is disclosed, the method comprising: providing a first blade shell part comprising a blade shell body with a leading edge and a trailing edge; providing a shear web with a first glue flange and a second glue flange, the first glue flange having a first web glue surface and the second glue flange having a second web glue surface, the first glue flange and/or the second glue flange of the shear web optionally comprising longitudinally extending gasket(s) at first and/or second glue flange edges of respective first and/or second glue flange(s), wherein the gasket may be configured for at least partly contacting an inner surface of a blade shell part; providing a second blade shell part comprising a blade shell body with a leading edge and a trailing edge, and a primary spar glue surface; optionally providing one or more spacer elements, e.g. on the second web glue surface and/or on the primary spar glue surface; arranging the second blade shell part on the shear web, optionally such that at least one of the spacer elements contact the primary spar glue surface of the second blade shell part and/or such that at least one of the spacer elements contact the second web glue surface of the shear web; and injecting glue between the primary spar glue surface and the second web glue surface. The method may be a method for manufacturing a wind turbine blade as disclosed herein.

The disclosed blade shell part, wind turbine blade and method allows for an optimized use of glue by enabling a more precise control of glue joint properties, such as glue thickness in the leading edge glue joint. Thus the amount of glue for the glue joint may be heavily reduced and/or the requirements to glue properties (such as strength, thickness, viscosity, curing time, and/or working range) may be reduced in turn reducing the material costs and/or weight. Further, an optimized leading edge glue joint may reduce cycle time. Even more advantageously, the present disclosure enables a glue joint, e.g. a leading edge glue joint and/or blade shell part/shear web glue joint, with improved mechanical strength due to improved control of the glue thickness.

A blade shell part/wind turbine blade extends from a root end to a tip end along a longitudinal axis and comprises a root region, a transition region, and an airfoil region. The transition region of the blade shell part/wind turbine blade comprises a shoulder defining a maximum chord of the blade shell part/wind turbine blade.

The present disclosure advantageously relates to blade shell parts, wind turbine blades and manufacture of wind turbine blades, e.g. having a blade length of at least 40 metres, or at least 45 metres, or even at least 50 metres. The blade shell parts may be prebent so that, when assembled to a wind turbine blade and mounted on an upwind configured horizontal wind turbine in a non-loaded state, they will curve forward out of the rotor plane so that the tip to tower clearance is increased. A blade shell part has a tip end and a root end with an inner surface and an outer surface. The inner surface of a blade shell part is a surface that is not exposed to the surroundings when the blade shell part is assembled to a wind turbine blade. The outer surface of a blade shell part is a surface that is exposed to the surroundings when the blade shell part is assembled to a wind turbine blade.

The blade shell part, such as the first blade shell part, may comprise a first glue flange extending from the leading edge and having a first glue flange edge and a first glue surface with a first width. Typically, the first width ranges from 5 cm to 20 cm. The first glue flange may extend from the leading edge such that the glue flange (first glue surface) can be glued to an inner surface of a second blade shell.

The blade shell part, such as the first blade shell part, may comprise a first glue flange extending from the trailing edge and having a first glue flange edge and a first glue surface with a first width. Typically, the first width ranges from 5 cm to 20 cm.

The second glue surface of the second blade shell part may be at the leading edge or at the trailing edge of the second blade shell part. The second glue surface of the second blade shell part may be an inner surface of the second blade shell.

The first glue flange may comprise a longitudinally extending gasket or gasket element for at least partly contacting an inner surface of another blade shell part.

The wind turbine blade optionally comprises one or more shear webs between the first blade shell part and the second blade shell part.

The first glue flange and/or the second glue flange of the shear web may comprise longitudinally extending gasket(s) at first and/or second glue flange edges of respective glue flanges, wherein the gasket is configured for at least partly contacting an inner surface of a blade shell part. Accordingly, the first glue flange of the shear web may comprise a longitudinally extending first gasket at the first glue flange edge of the first glue flange. The first glue flange of the shear web may comprise a longitudinally extending second gasket at the second glue flange edge of the first glue flange. The second glue flange of the shear web may comprise a longitudinally extending first gasket at the first glue flange edge of the second glue flange. The second glue flange of the shear web may comprise a longitudinally extending second gasket at the second glue flange edge of the second glue flange.

The gasket or gasket element, such as first gasket and/or second gasket, may be a rubber gasket. The gasket may be arranged on the first glue flange edge or within a distance of about 10 cm from the first glue flange edge. The gasket provides or facilitate a seal near the first glue flange edge for a glue cavity between first and second blade shell parts. The gasket may be a self-sealing gasket, i.e. a gasket that seals a cavity, when the cavity is filled with a medium, such as a liquid or glue. The gasket may have a concave first surface facing the glue surface/glue cavity. The gasket may have a second surface configured to at least partly facing and/or contacting an inner surface of a blade shell part. When glue is filled into to glue cavity, the glue presses on the first surface and forces the second surface or at least a part thereof against the inner surface of the blade shell part, thus sealing the glue cavity. A first edge of the gasket may be configured for attachment to a first glue flange edge or a second glue flange edge. The first edge of the gasket may be provided with a longitudinally extending recess for accommodating the first glue flange edge. A second edge of the gasket may contact the inner surface of the blade shell part. One or more barbs may extend into the recess at the first edge of the gasket. The gasket may be glued to the first glue flange edge. One or more longitudinally extending protrusions may be arranged on the second surface, e.g. within a distance from the second edge of the gasket. The distance may be less than 3 cm.

A spacer element provides a space or distance between two glue surfaces. Use of spacer elements along the trailing edge enables improved control of the glue joint properties by ensuring a minimum glue thickness along the glue joint. Use of spacer elements along the glue joint(s) enables improved control of the glue joint properties by ensuring a minimum glue thickness along the glue joint. Spacer element(s) are provided on the first glue surface and optionally configured to provide a space and/or distance between the first glue surface of the first glue flange and a second glue surface of a second blade shell part, e.g. in the direction normal to the first glue surface.

Spacer element(s) may be separate elements attached to the first glue surface and/or integrated in the first glue flange/first glue surface. A spacer element may be circular, oval or any desired shape. In one or more exemplary blade shell parts/wind turbine blades, spacer element(s) may have an oblong shape, such as a straight oblong shape (I-shape). In one or more exemplary blade shell parts/wind turbine blades, one or more spacer element(s) may have an X-shape, a V-shape, a T-shape, a Z-shape, an L-shape, and/or an S-shape. Different spacer elements having different shapes may be used. First spacer elements may be oblong and arranged on the first glue surface parallel to the longitudinal axis. Oblong first spacer element(s) may be angled with respect to the longitudinal axis, e.g. in the range from 0 degrees to 45 degrees or from 45 degrees to 90 degrees.

The one or more spacer elements may comprise a first set of first spacer elements. The first set of spacer elements is in one or more exemplary blade shell parts provided on the first glue surface. A first spacer element and/or each first spacer element of the first set of spacer elements may have a height in the range from 1 mm to 10 mm, such as in the range from 2 to 5 mm. In one or more exemplary blade shell parts/wind turbine blades, first spacer elements have a height of 3 mm. The first set of first spacer elements may be divided in one or more subgroups.

In one or more exemplary blade shell parts/wind turbine blades, a distance, such as a longitudinal distance measured along the longitudinal axis, between two neighbouring first spacer elements is in the range from 20 cm to 150 cm, such as in the range from 30 cm to 100 cm. In one or more exemplary blade shell parts/wind turbine blades, a distance between two neighbouring subgroups of first spacer elements is in the range from 20 cm to 150 cm.

The first spacer elements are arranged at respective first distances from the first glue flange edge along the first glue surface. The first distances may be less than $0.9*W1$, where $W1$ is the first width of the first glue surface. The first distances may be less than $0.5*W1$, where $W1$ is the first width of the first glue surface. In one or more exemplary blade shell parts/wind turbine blades, the first distances may be larger than $0.1*W1$, where $W1$ is the first width of the first glue surface. Accordingly, the first distances may be in the range from $0.1*W1$ to $0.5*W1$.

The one or more spacer elements may comprise a second set of second spacer elements. The second set of spacer elements is in one or more exemplary blade shell parts provided on the first glue surface. A second spacer element and/or each second spacer element may have a height in the range from 1 mm to 10 mm, such as in the range from 2 to 5 mm. In one or more exemplary blade shell parts/wind turbine blades, second spacer elements have a height of 3 mm. The second set of second spacer elements may be divided in one or more subgroups.

In one or more exemplary blade shell parts/wind turbine blades, a distance, such as a longitudinal distance measured along the longitudinal axis, between two neighbouring second spacer elements is in the range from 20 cm to 150 cm, such as in the range from 30 cm to 100 cm. In one or more exemplary blade shell parts/wind turbine blades, a distance between two neighbouring subgroups of second spacer elements is in the range from 20 cm to 150 cm.

The second spacer elements are arranged at respective second distances from the first glue flange edge along the first glue surface. The second distances may be larger than $0.5*W1$, where $W1$ is the first width of the first glue surface. The second distances may be in the range from $0.5*W1$ to $W1$, where $W1$ is the first width of the first glue surface. In one or more exemplary blade shell parts/wind turbine blades, the one or more spacer elements comprises a second set of second spacer elements, each second spacer element having a height in the range from 1 mm to 10 mm and being arranged at respective second distances from the first glue flange edge along the first glue surface, the second distances being in the range from $0.5*W1$ to $W1$, where $W1$ is the first width of the first glue surface. Second spacer elements may be oblong and arranged on the first glue surface parallel or angled to the longitudinal axis. Oblong first spacer element(s) may be angled with respect to the longitudinal axis, e.g. in the range from 0 degrees to 45 degrees or from 45 degrees to 90 degrees. In one or more exemplary blade shell parts/wind turbine blades, second spacer element(s) are oblong and angled 30 degrees or 45 degrees with respect to the longitudinal axis.

A distance, such as a longitudinal distance measured along the longitudinal axis, between a first spacer element and a second spacer element neighbouring the first spacer element may be in the range from 10 cm to 75 cm.

The first glue flange may be flexible. Accordingly, the first glue flange may have a thickness and be made of a material such that the first glue flange of a first blade shell part is capable of adapting to the inner surface of a second blade shell part that is lowered onto the first blade shell part and at the same time providing a sufficient sealing between the first glue flange edge and the inner surface of the second blade shell part.

A first glue flange with desired flexibility may be obtained by selecting a first glue flange with appropriate geometric measures. Accordingly, the first glue flange may have a maximum thickness in the range from 1 mm to 20 mm. In one or more exemplary blade shell parts/wind turbine blades, the thickness of the first glue flange varies along the first glue surface from the leading edge to the first glue flange edge. In one or more exemplary blade shell parts/wind turbine blades, the first glue flange may have a thickness (mean value) in the range from 1 mm to 15 mm. In one or more presently preferred exemplary blade shell parts/wind turbine blades, the first glue flange may have a thickness (mean value) in the range from 3 mm to 10 mm.

The first glue flange may have one or more openings, e.g. in order to allow injection of glue into a glue cavity formed by the first glue surface of a first blade shell part and the second glue surface of the second blade shell part and/or to allow leakage of excess glue from the glue cavity. The one or more openings of the first glue flange may comprise a first opening and a second opening neighbouring the first opening. A distance, such as a longitudinal distance measured along the longitudinal axis, between the first opening and the second opening of the first glue flange may be in the range from 0.5 m to 5 m, such as in the range from 1 m to 3 m, e.g. in the range from 1.5 m to 2 m.

The second blade shell part may have one or more openings, e.g. in order to allow injection of glue into a glue cavity and/or to allow leakage of excess glue from the glue cavity and/or ventilation or evacuation of air from the glue cavity. The one or more openings of the second blade shell part may comprise a first opening and a second opening neighboring the first opening. A distance, such as a longitudinal distance measured along the longitudinal axis, between the first opening and the second opening in the second blade shell part may be in the range from 0.5 m to 5 m, such as in the range from 1 m to 3 m, e.g. in the range from 1.5 m to 2 m.

The one or more openings of the second blade shell part may comprise one or more openings in the second glue surface. The one or more openings of the second blade shell part may comprise one or more openings in the main spar glue surface.

A blade shell part, such as the first blade shell part and/or the second blade shell part, may comprise a leading edge seal extending along the leading edge, e.g. in order to provide a seal near or at the leading edge for a glue cavity between first and second blade shell parts.

A blade shell part, such as the first blade shell part and/or the second blade shell part, may comprise a trailing edge seal extending along the trailing edge, e.g. in order to provide a seal near or at the trailing edge for a glue cavity between first and second blade shell parts.

The wind turbine blade comprises a first blade shell part and a second blade shell part.

The second blade shell part comprises a second glue surface on the inner surface of the second blade shell part. The second glue surface has a second width typically ranging from 5 to 20 cm. The second blade shell part may comprise one or more openings in the blade shell body. The one or more openings may be arranged in the second glue surface of the blade shell part, e.g. in order to allow injection of glue into a glue cavity formed by the first glue surface of a first blade shell part and the second glue surface of the second blade shell part and/or to allow leakage of excess glue from the glue cavity. Opening(s) in the first glue flange and/or in the second glue surface of the second blade shell part allows application of glue after arranging the second blade shell part on the first blade shell part. Thereby, the amount of glue used may be reduced significantly.

The first blade shell part and/or the second blade shell part may comprise a primary spar cap and/or a primary spar glue surface for gluing a shear web of the wind turbine blade to the blade shell part(s).

One or more openings may be arranged in the primary spar glue surface of the second blade shell part, e.g. in order to allow injection of glue into a glue cavity formed by the primary spar glue surface of the second blade shell part and the second web glue surface of the shear web and/or to allow leakage of excess glue from the glue cavity.

Opening(s) in the primary spar glue surface allows application of glue after arranging the second blade shell part on the first blade shell part/shear web. Thereby, the amount of glue used may be reduced significantly.

The one or more openings of the second blade shell part may comprise a first opening and a second opening neighboring the first opening. A distance, such as a longitudinal distance measured along the longitudinal axis, between the first opening and the second opening of the second blade shell part may be in the range from 0.5 m to 5 m, such as in the range from 1 m to 3 m, e.g. in the range from 1.5 m to 2 m.

The disclosed method advantageously enables a reduction of the amount of glue used in the manufacture of wind turbine blades.

In one or more exemplary methods, injecting glue between the first glue surface and the second glue surface may comprise injecting glue through one or more openings in the first glue flange or through one or more openings in the blade shell body and/or in the second glue surface of the second blade shell.

In one or more exemplary methods, injecting glue between the primary spar glue surface and the second web glue surface may comprise injecting glue through one or more openings in the primary spar glue surface.

The method may comprise providing a gasket, such as a rubber gasket, near or at the first glue flange edge and/or providing a leading edge seal extending along the leading edge of the first blade shell part. Providing gasket and/or leading edge seal may facilitate provision of a glue cavity for injection of glue between the first glue surface and the second glue surface. In the method, providing a gasket may comprise attaching the gasket to the first glue flange edge, e.g. before arrange the second blade shell part on the first blade shell part. The method may comprise providing a glue seal near or at the first glue flange edge and/or along the leading edge of the first blade shell part.

The method may comprise providing a gasket, such as a rubber gasket, near or at a first glue flange edge and/or a second glue flange edge of a shear web glue flange, such as the first glue flange and/or the second glue flange of the shear web.

In the method, providing a gasket may comprise attaching the gasket to the first glue flange edge of shear web glue flange.

In one or more exemplary methods, providing one or more spacer elements on the first glue flange and/or on the second glue flange may comprise attaching a first set of spacer elements to the first glue surface and/or to the second glue surface, each spacer element having a height in the range from 1 mm to 10 mm.

In one or more exemplary methods, providing one or more spacer elements on the first glue flange may comprise forming a first set of spacer elements as an integrated part of the first glue flange/first glue surface.

In one or more exemplary methods, providing one or more spacer elements on the second glue flange may comprise forming a first set of spacer elements as an integrated part of the second glue flange/second glue surface.

DETAILED DESCRIPTION

Figure 2:
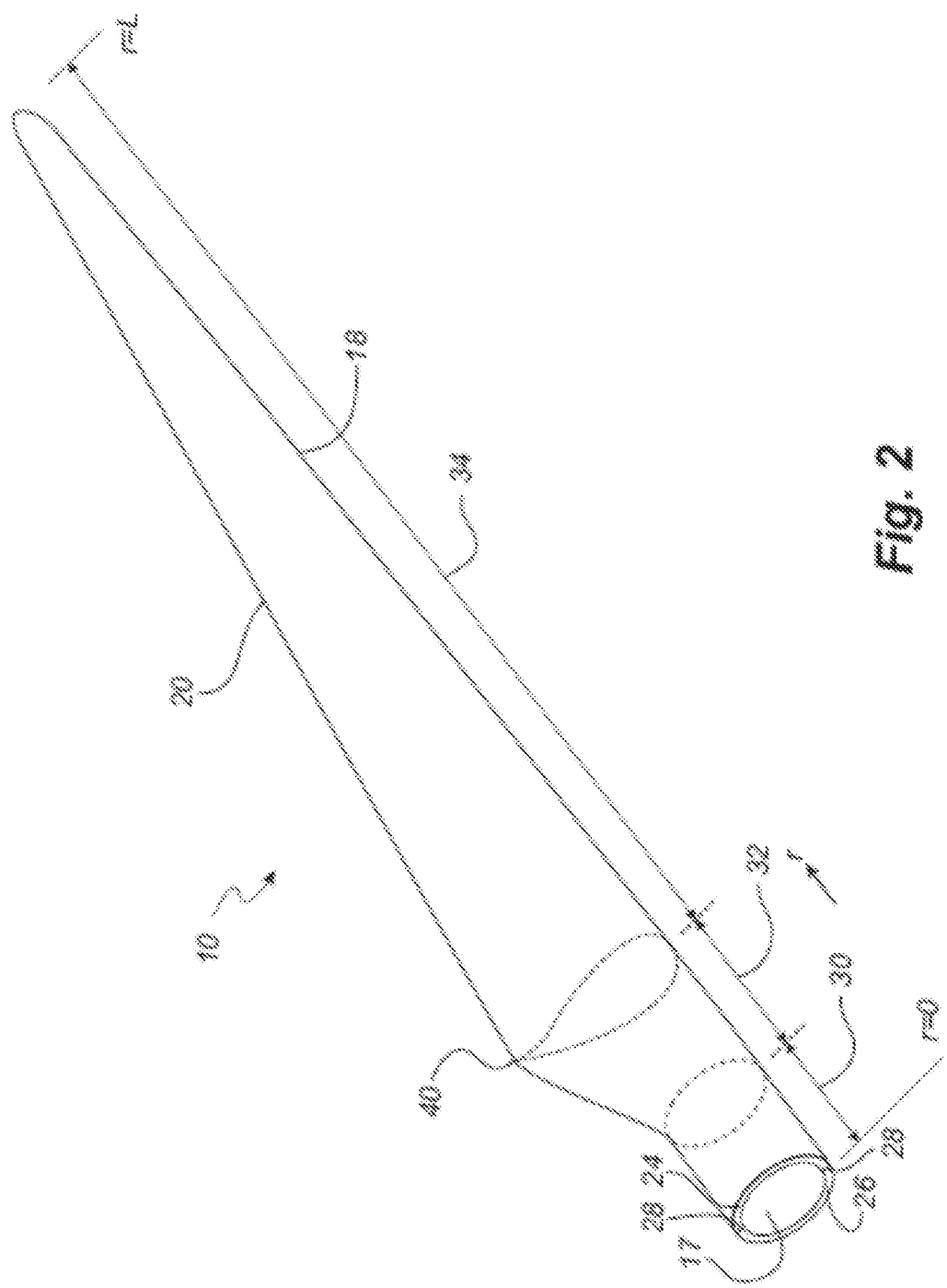
Figure 5:
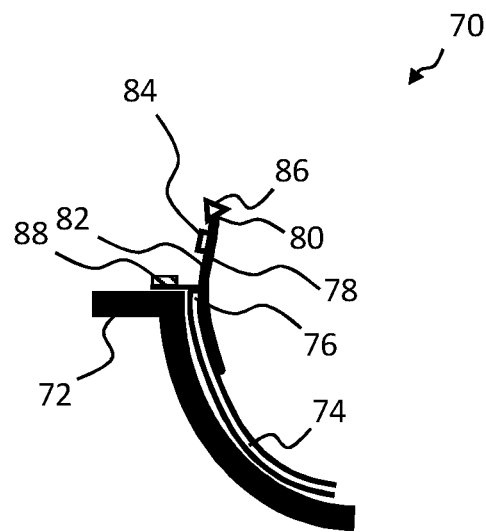
Figure 6:
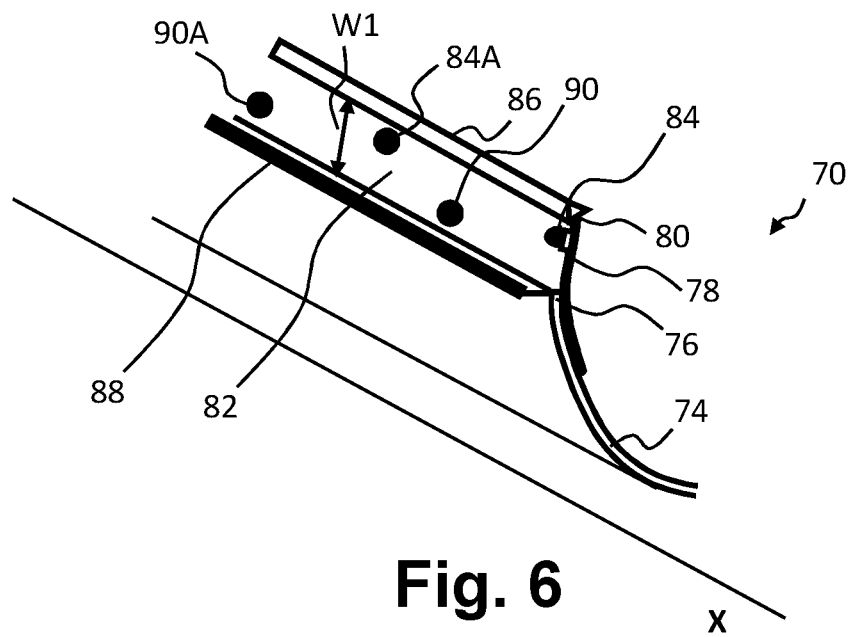
Figure 7:
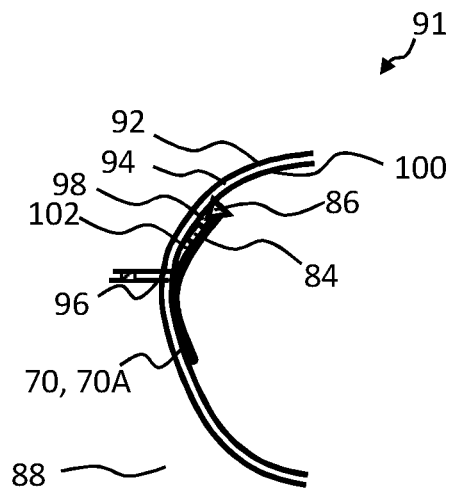
Figure 8:
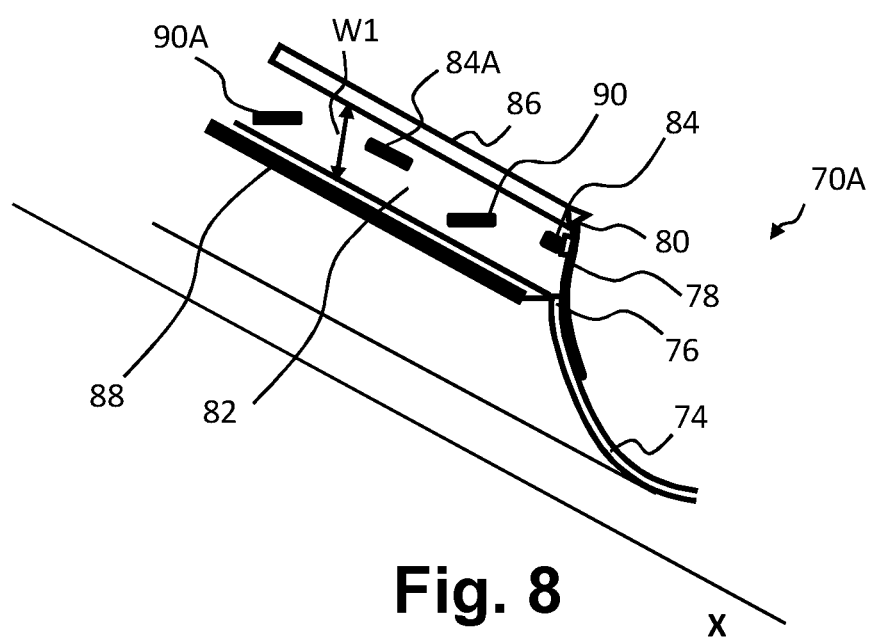
Figure 9:
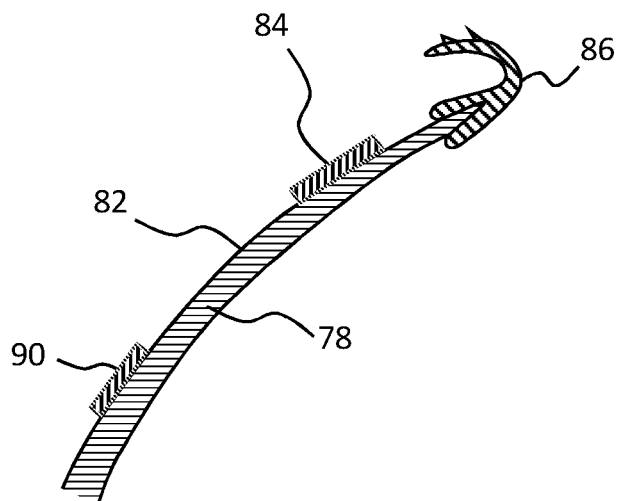
Figure 10:
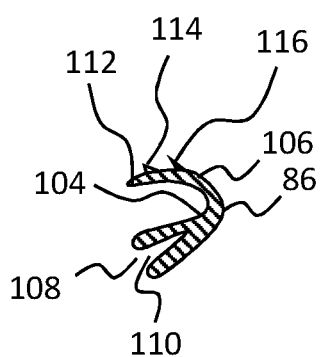
Figure 11:
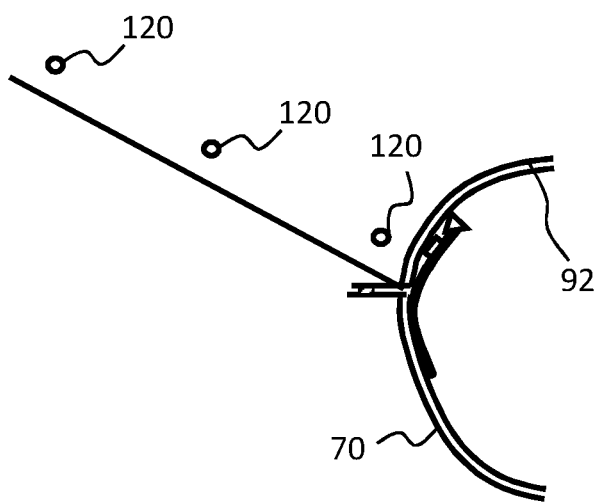

The invention is explained in detail below with reference to the drawings, in which FIG. 1 shows a wind turbine, FIG. 2 shows a schematic view of a wind turbine blade, FIG. 3 shows a schematic view of an airfoil profile, FIG. 4 shows a schematic view of a wind turbine blade, seen from above and from the side, FIG. 5 shows a part of a cross sectional view of a blade shell part according to the invention, FIG. 6 shows a view of a blade shell part according to the invention, FIG. 7 shows a part of a cross sectional view of a wind turbine blade according to the invention, FIG. 8 shows a view of a blade shell part according to the invention, FIG. 9 shows a cross-section of and exemplary first glue flange with gasket and spacer elements, FIG. 10 shows an exemplary gasket, and FIG. 11 shows a part of an exemplary wind turbine blade.

The present invention relates to manufacture of blade shell parts of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell comprising two blade shell parts made of fibre-reinforced polymer and is typically made as a pressure side or upwind blade shell part 24 and a suction side or downwind blade shell part 26 that are glued together along bond lines 28 extending along the trailing edge 20 and the leading edge 18 of the blade 10. Typically, the root ends of the blade shell parts 24, 26 has a semi-circular or semi-oval outer cross-sectional shape.

FIGS. 3 and 4 depict parameters, which may be used to explain the geometry of blade shell parts to be manufactured according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade and blade shell parts. The blade and blade shell parts have a total blade length L. As shown in FIG. 3, the root end is located at position r=0, and the tip end located at r=L. The shoulder 40 of the blade shell parts is located at a position $r=L_w$, and has a shoulder width W, which equals the chord length at the shoulder 40. The diameter of the root is defined as X. Further, the blade/blade shell parts is provided with a prebend, which is defined as Δy, which corresponds to the out of plane deflection from a pitch axis 22 of the blade.

FIG. 5 shows a part of a cross-sectional view of a blade shell part. The blade shell part 70 is arranged in a blade mould 72. The blade shell part 70 comprises a blade shell body 74 with a leading edge 76 and a trailing edge (not shown), and a first glue flange 78 extending from the leading edge 76 and having a first glue flange edge 80 and a first glue surface 82 with a first width. The first glue flange 78 is provided with one or more spacer elements on the first glue surface, including a first spacer element 84 of a first set of spacer elements on the first glue surface 82. The first spacer element 84 has a height of 3 mm and is arranged within a first distance from the first glue flange edge 80, where the first distance is less than half the first width. The first glue flange 78 comprises a longitudinally extending rubber gasket 86 arranged on the first glue flange edge 80 for at least partly contacting an inner surface of another blade shell part. The first glue flange 78 is flexible with a maximum thickness between 3 mm and 10 mm and configured to adapt to the inner surface of another (second) blade shell part that is lowered onto the blade shell part (first blade shell part) 70 and at the same time providing a sufficient sealing between the first glue flange edge 80 and the inner surface (not shown) of the second blade shell part. The blade shell part 70 comprises a leading edge seal 88 extending along the leading edge 76 in order to seal the glue cavity between first and second glue surfaces of first and second blade shell parts, respectively, at the leading edge 76.

FIG. 6 is a cross sectional perspective view of the blade shell part 70. A first set of first spacer elements comprises first spacer elements 84, 84A that are provided on the first glue flange 78 and extending from the first glue surface 82. The first glue surface 82 has a first width W1, optionally varying along the longitudinal axis X, and the first spacer elements 84, 84A are arranged on the first glue surface at respective first distances from the first glue flange edge 80. The first distances are in the range from 0.1*W1 to 0.5*W1. The first spacer element 84 and the neighbouring first spacer element 84A have a circular shape and are arranged with a longitudinal distance of 80 cm between each other. A second set of second spacer elements comprises second spacer elements 90, 90A that are provided on the first glue flange 78 and extending from the first glue surface 82. The second spacer elements 90, 90A have a circular shape and are arranged on the first glue surface at respective second distances from the first glue flange edge 80, wherein the second distances are in the range from 0.5*W1 to W1. The second spacer element 90 and the neighbouring second spacer element 90A have a longitudinal distance of 80 cm between each other. The second spacer element 90 is arranged between the first spacer elements 84, 84A along the longitudinal axis with a longitudinal distance to both first spacer elements 84, 84A of about 40 cm.

FIG. 7 shows a part of a cross-sectional view of a wind turbine blade 91 comprising the blade shell part 70 as a first blade shell part and a second blade shell part 92. The second blade shell part 92 comprises a blade shell body 94 with a leading edge 96 and having a second glue surface 98 on an inner surface 100 thereof. The first spacer element 84 contacts the second glue surface 98 and glue 102 is arranged between the first glue surface and the second glue surface. The flexible first glue flange has adapted to the inner surface of the second blade shell part 92 and the gasket 86 provides a seal at the first glue flange edge. The first and second glue surfaces form, together with leading edge seal 88 and gasket 86, a glue cavity for the glue. Optionally, glue 102 has been injected through one or more openings in the shell body 94 of the second blade shell part 92 and/or through one or more openings in the first glue flange 78, the one or more openings providing access to the glue cavity from the outside of the wind turbine blade or from the inside of the wind turbine blade. The leading edge seal 88 is optionally removed in the post-processing of the wind turbine blade FIG. 8 is a cross sectional perspective view of a blade shell part 70A. A first set of first spacer elements comprises first spacer elements 84, 84A that are provided on the first glue flange 78 and extending from the first glue surface 82. The first spacer elements 84, 84A are oblong and arranged on the first glue surface at respective first distances from the first glue flange edge 80 parallel to the longitudinal axis X. The first spacer elements may be angled with respect to the longitudinal axis, e.g. in the range from 0 degrees to 45 degrees or from 45 degrees to 90 degrees. The first distances are in the range from 0.1*W1 to 0.5*W1. The first spacer element 84 and the neighbouring first spacer element 84A are arranged with a longitudinal distance of 80 cm between each other. A second set of second spacer elements comprises second spacer elements 90, 90A that are provided on the first glue flange 78 and extending from the first glue surface 82. The second spacer elements 90, 90A are oblong and angled 45 degrees with respect to the longitudinal axis. The second spacer element 90 and the neighbouring second spacer element 90A have a longitudinal distance of 80 cm between each other. The second spacer element 90 is arranged between the first spacer elements 84, 84A along the longitudinal axis with a longitudinal distance to both first spacer elements 84, 84A of about 40 cm.

FIG. 9 shows a cross-sectional view of parts of a blade shell part. The blade shell part, e.g. the first blade shell part, comprises a first glue flange 78 extending from the leading edge 76 and having a first glue flange edge 80 and a first glue surface 82 with a first width. The first glue flange 78 comprises a longitudinally extending rubber gasket 86 with a longitudinally extending recess accommodating the first glue flange edge 80. The gasket in FIG. 8 is a self-sealing gasket for at least partly contacting an inner surface of another blade shell part to form a seal between the first glue flange edge and the inner surface of another blade shell part.

The first glue flange 78 is provided with one or more spacer elements including a first spacer element 84 of a first set of spacer elements. The first spacer element 84 has a height of 3 mm and is arranged within a first distance from the first glue flange edge 80, where the first distance is less than half the first width. The first glue flange 78 is flexible with a maximum thickness between 3 mm and 10 mm and configured to adapt to the inner surface of another (second) blade shell part that is lowered onto the blade shell part (first blade shell part) 70 and at the same time providing a sufficient sealing between the first glue flange edge 80 and the inner surface (not shown) of the second blade shell part. Further, a second spacer element 90 is arranged within a second distance from the first glue flange edge 80, where the second distance is larger than half the first width.

FIG. 10 shows an exemplary gasket. The gasket 89 is a self-sealing gasket and comprises a concave first surface 104 facing the first glue surface 82. The gasket comprises a second surface 106 configured to at least partly facing and/or contacting an inner surface of a blade shell part. When glue is filled into to glue cavity, the glue presses on the first surface 104 and forces a part of the second surface 106 against the inner surface of the blade shell part, thus sealing the glue cavity between the first glue surface and the second glue surface.

A first edge 108 of the gasket 86 is configured for attachment to the first glue flange edge 80 by a press-fit arrangement. Accordingly, the first edge 108 of the gasket is provided with a longitudinally extending recess 110 for accommodating the first glue flange edge. The gasket 86 has a second edge 112. One or more barbs (not shown) extend into the recess 110 at the first edge 108 of the gasket. The gasket may be glued to the first glue flange edge. A first and second longitudinally extending protrusion 114, 116 is arranged on the second surface at the second edge 112 of the gasket (at a distance less than 3 cm from the second edge). The protrusions 114, 116 conform to the inner surface of the second blade shell part and act as a seal for the glue cavity.

FIG. 11 shows a perspective view of and exemplary wind turbine blade. The wind turbine blade comprises a first blade shell part 70 and second blade shell part 92. Upon arranging the second blade shell part on the first blade shell part, glue is injected through openings 120 in the second glue surface of the second blade shell part 92 into the glue cavity formed by respective first and second glue surfaces, gasket and leading edge seal. Openings 120 are spaced in the range from 50 cm to 3 m along the wind turbine blade. The openings 120 allow for a sequential filling of the glue cavity.

The invention has been described with reference to preferred embodiments. However, the scope of the invention is not limited to the illustrated embodiments, and alterations and modifications can be carried out without deviating from the scope of the invention that is defined by the following claims. The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side blade shell part/upwind blade shell part
26 suction side blade shell part/downwind blade shell part
28 bond lines
29 horizontal
30 root region
32 transition region
34 airfoil region
50 airfoil profile
52 pressure side/upwind side
54 suction side/downwind side
56 leading edge
58 trailing edge
60 chord
62 camber line/median line
70, 70A blade shell part/first blade shell part
72 blade mould
74 blade shell body
76 leading edge
78 first glue flange
80 first glue flange edge
82 first glue surface
84 first spacer element
84A first spacer element
86 gasket
88 leading edge seal
90 second spacer element
90A second spacer element
91 wind turbine blade 92 second blade shell part
94 shell body
96 leading edge
98 second glue surface
100 inner surface
102 glue
104 first surface of gasket
106 second surface of gasket
108 first edge of gasket
110 recess
112 second edge of gasket
114 first longitudinally extending protrusion
116 second longitudinally extending protrusion
120 opening/glue inlet/glue outlet
c chord length
$d_t$ position of maximum thickness
$d_f$ position of maximum camber
$d_p$ position of maximum pressure side camber
f camber
L blade length
r local radius, radial distance from blade root
t thickness
D blade root diameter
Δy prebend
X longitudinal axis

The invention claimed is:

1. A blade shell part (70, 70A) for a wind turbine blade, wherein the blade shell part is made of a composite structure comprising a reinforcement material embedded in a polymer matrix, the blade shell part extending from a tip end to a root end, wherein the blade shell part comprises:
   a blade shell body (74) with a leading edge (76) and a trailing edge; and
   a first glue flange (78) extending from the leading edge (76) and having a first glue flange edge (80) and a first glue surface (82) with a first width,
   wherein the first glue surface is provided with one or more spacer elements (84, 84A, 90, 90A).

2. The blade shell part according to claim 1, wherein the first glue flange (78) comprises a longitudinally extending gasket (86) for at least partly contacting an inner surface of another blade shell part.

3. The blade shell part according to claim 2, wherein the gasket (86) is a rubber gasket arranged on the first glue flange edge (80).

4. The blade shell part according to claim 1, wherein the one or more spacer elements comprises a first set of first spacer elements, each first spacer element having a height in the range from 1 mm to 10 mm.

5. The blade shell part according to claim 4,
   wherein a distance between two neighbouring first spacer elements is in the range from 20 cm to 150 cm, and/or
   wherein the first spacer elements are arranged at respective first distances from the first glue flange edge along the first glue surface, the first distances being less than 0.5*W1, where W1 is the first width of the first glue surface.

6. The blade shell part according to claim 1, wherein the one or more spacer elements comprises a second set of second spacer elements, each second spacer element having a height in the range from 1 mm to 10 mm and being arranged at respective second distances from the first glue flange edge along the first glue surface, the second distances being in the range from 0.5*W1 to W1, where W1 is the first width of the first glue surface.

7. The blade shell part according to claim 1, wherein the first glue flange is flexible.

8. The blade shell part according to claim 1, wherein the first glue flange has a maximum thickness in the range from 1 mm to 20 mm.

9. The blade shell part according to claim 1, wherein the thickness of the first glue flange varies along the first glue surface from the leading edge to the first glue flange edge.

10. The blade shell part according to claim 1, wherein the first glue flange has one or more openings (120).

11. The blade shell part according to claim 1, wherein the blade shell part comprises a leading edge seal (88) extending along the leading edge.

12. A wind turbine blade (91) comprising a first blade shell part (70) and a second blade shell part (90), wherein the first blade shell part is a blade shell part according to claim 1, the second blade shell part comprising a blade shell body with a leading edge and a trailing edge and having a second glue surface (98) on an inner surface of a second blade shell part, wherein at least one of the spacer elements contact the second glue surface and glue (102) is arranged between the first glue surface (82) and the second glue surface (98).

13. The wind turbine blade according to claim 12, wherein the second blade shell part comprises one or more openings in the blade shell body.

14. A method of manufacturing a wind turbine blade, wherein the wind turbine blade is manufactured as a composite structure comprising a reinforcement material embedded in a polymer matrix, the method comprising:
   providing a first blade shell part comprising a blade shell body with a leading edge and a trailing edge, and a first glue flange at the leading edge, the first glue flange having a first glue flange edge and a first glue surface with a first width;
   providing one or more spacer elements on the first glue surface;
   providing a second blade shell part comprising a blade shell body with a leading edge and a trailing edge, and a second glue surface on an inner surface of the second blade shell part;
   arranging the second blade shell part on the first blade shell part such that at least one of the spacer elements contact the second glue surface of the second blade shell part; and
   injecting glue between the first glue surface and the second glue surface.

15. The method according to claim 14, wherein injecting glue between the first glue surface and the second glue surface comprises injecting glue through one or more openings in the first glue flange or through one or more openings in the blade shell body of the second blade shell.

16. The blade shell part according to claim 6, wherein a distance between two neighbouring ones of the second spacer elements is in the range from 20 cm to 150 cm.

* * * * *